E. U. GIBBS.
BEARING FOR HYDRAULIC TURBINE SHAFTS.
APPLICATION FILED SEPT. 7, 1921.

1,425,378.

Patented Aug. 8, 1922.

Eugene U. Gibbs, Inventor

By  Attorney

UNITED STATES PATENT OFFICE.

EUGENE U. GIBBS, OF YORK, PENNSYLVANIA, ASSIGNOR TO S. MORGAN SMITH COMPANY, OF YORK, PENNSYLVANIA, A CORPORATION OF PENNSYLVANIA.

BEARING FOR HYDRAULIC-TURBINE SHAFTS.

1,425,378.    Specification of Letters Patent.    Patented Aug. 8, 1922.

Application filed September 7, 1921. Serial No. 499,097.

*To all whom it may concern:*

Be it known that I, EUGENE U. GIBBS, a citizen of the United States, residing at York, in the county of York and State of Pennsylvania, have invented new and useful Improvements in Bearings for Hydraulic-Turbine Shafts, of which the following is a specification.

This invention relates to a bearing for use on hydraulic turbine shafts and particularly to an adjustable guide bearing of the cone type, the object of the invention being to provide a bearing of this class having very simple and easily controllable means for taking up wear and moving the bearing parallel with the center of the shaft.

A common fault of the bearings ordinarily used on hydraulic turbine shafts is that such bearings are subject to great wear and, where the bearing is permitted to run until the wear reaches such proportions as to be detrimental to the turbine runner and its running joints, it is necessary to stop the turbine, remove the bearing, and fit a new lining in order to take up the wear. Where a spare lining is not kept on hand it is necessary to shut down the turbine until a new lining can be procured.

One of the objects of this invention is to produce a bearing which may be adjusted to take up wear while the turbine or other machine supported by the bearing is in operation, and thus avoid the necessity of shutting down the machine in order to take up wear in the bearing.

The invention consists in the construction and arrangement of the several parts which will be more fully hereinafter described and claimed.

Figure 1:
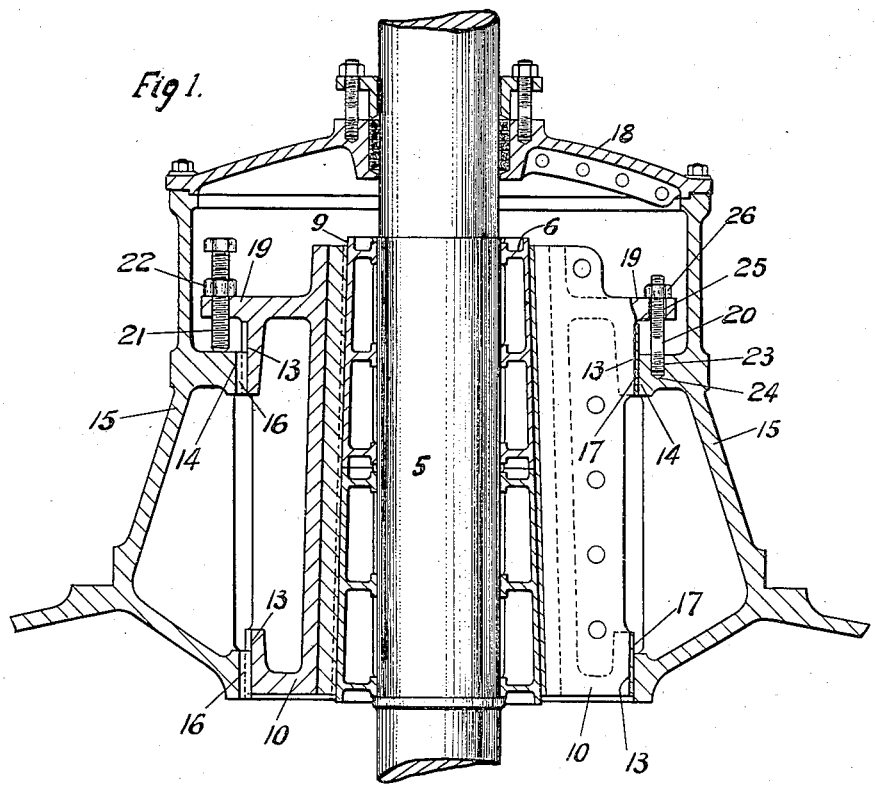
Fig. 1 is a transverse section through the upper part of the enclosing frame of a hydraulic turbine, showing the improved bearing applied to a part of the turbine shaft, the section being taken on the line 1—1, Fig. 2.
Figure 2:
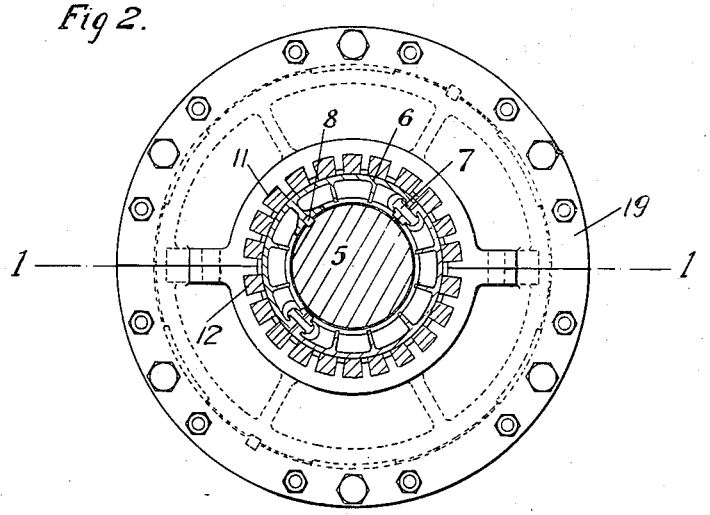
Fig. 2 is a horizontal section through the turbine shaft and a part of the bearing.

The numeral 5 designates a hydraulic turbine shaft which will be operated as usual. Mounted on the shaft 5 is a bronze sleeve 6 which is made sectional or in halves and is held together by gibhead keys 7, the sleeve as a whole being secured to the shaft by a straight key 8, as shown by Fig. 2. The inside part of the bronze sleeve 6 has a straight bore to fit the shaft 5, the outer member of the sleeve having an outside surface 9 turned and finished on a taper. The bearing 10 for supporting this sleeve is preferably made of cast iron in halves and bolted together and has spaced grooves 11 in the inner portion thereof to receive lignum vitæ strips 12 having the cross sectional contour shown by Fig. 2. The inner edges of these bearing or lignum vitæ strips are turned and finished conical, to snugly engage and correspond to the outer tapered surface of the bronze sleeve 6. The outer surfaces 13 of the frame 10 are cylindrical and fit in a corresponding bore 14 of a stationary frame or support 15, which provides an enclosure for the bearing. The frame 10 is prevented from rotating within the frame 15 by keys 16 introduced between the said frame 10 and stationary frame or support 15, as clearly shown by Fig. 1. The keys 16 permit the frame 10 to slide parallel with the shaft but obstruct rotation of this frame. Where the surfaces of the frame 10 come into contact with portions of the frame 15, a bronze facing strip or strips 17 are interposed, to prevent the contiguous surfaces of these frames from rusting and sticking together. A cover plate 18 is applied to the frame 15, as shown, to serve as a closure for a purpose which will be presently explained. The frame 10 has outwardly projecting flange members 19 carrying screw studs 20 and set screws 21, the latter screws being provided with set nuts 22. The screw studs 20 are terminally seated in screw bores 23 formed in an annular shoulder 24 of the frame 15, the said studs 20 loosely extending through bores 25 in the parts of the annular flange 19. Each stud 20 is provided with an adjusting nut 26.

The improved bearing is of the water lubricated type and the cover plate 18 is firmly secured and positioned as shown, to prevent the water from over-flowing out of the bearing. The cover plate is a well known structure and forms no part of the present invention.

When the wood surfaces or the inner edges of the lignum vitæ bearing strips 12 become worn and the bearing on the shaft can move out of its normal position, the adjustment of the parts to take up or compensate for wear is accomplished through the set screws 21 and studs 20. The set screws 21 are first slackened off and the studs 20 are drawn down and the bronze sleeve 6 is moved parallel to the axis of the shaft 5, and the surrounding frame is then set to bring the inner surfaces thereof in contact with the said sleeve, thus eliminating the wear space between the said sleeve and the lignum vitæ strips 12. By this simple operation the bearing will be restored to normal condition and such operation may be repeated when found necessary to compensate for wear, with material advantages in the operation of the shaft 5.

What is claimed as new is:

1. In a bearing of the class specified, the combination with a shaft, of a sleeve having an inner longitudinally straight bore to snugly receive the shaft and an outer tapered surface, and an adjustable bearing frame completely surrounding the sleeve and formed with a plurality of longitudinally disposed inner grooves with space strips of wood secured therein, the space strips having their inner edges tapered similarly to and bearing upon the outer surface of the sleeve.

2. In a bearing of the class specified, the combination with a shaft, of a sleeve snugly fitted over the shaft and having an outer tapered surface, and an adjustable frame completely surrounding the sleeve and having inner longitudinal grooves with tapered wood strips secured in said grooves to engage the outer tapered surface of the sleeve.

3. In a bearing of the class specified, the combination with a shaft, of a sleeve snugly fitted and completely enclosing a portion of the shaft, the said sleeve in part being spaced from the surface of the shaft and having an outer tapered bearing surface, an adjustable frame completely enclosing the said sleeve, and longitudinally disposed lignum vitæ strips secured in the inner side of the adjustable frame and having inner tapered edges bearing on the outer tapered surface of the sleeve.

4. In a bearing of the class specified, the combination with a shaft, of a bearing sleeve snugly fitted over and completely enclosing a portion of the shaft and having an outer member spaced from the shaft and provided with an outer tapered surface, an adjustable frame completely surrounding the outer member of the sleeve and having longitudinally spaced strips secured to the inner side of the frame and provided with inner tapered edges bearing on the outer surface of the sleeve, a fixed frame surrounding the adjustable frame, and means interposed between a portion of the adjustable frame and the fixed frame for shifting the said adjustable frame and strips carried thereby to compensate for wear.

5. In a bearing of the class specified, the combination with a shaft, of a bearing sleeve completely surrounding a portion of the shaft and having an outer member spaced from the shaft and provided with an outer tapered bearing face, an outer fixed enclosing frame, and an intermediate frame completely surrounding the sleeve and having sliding adjustment in the outer fixed frame and carrying longitudinally disposed wooden strips provided with tapered inner edges engaging the outer tapered surface of the sleeve.

In testimony whereof I have hereunto set my hand in presence of two subscribing witnesses.

EUGENE U. GIBBS.

Witnesses:
MARY GATES,
M. J. RAFFENSBERGER.